(12) United States Patent
Muramatsu et al.

(10) Patent No.: US 11,614,641 B2
(45) Date of Patent: Mar. 28, 2023

(54) EYEWEAR

(71) Applicant: Mitsui Chemicals, Inc., Tokyo (JP)

(72) Inventors: Akihiro Muramatsu, Marugame (JP); Akifumi Aono, Nagoya (JP); Ryuki Kan, Saijo (JP); Takafumi Ohto, Saijo (JP); Sho Tanaka, Tokyo (JP)

(73) Assignee: Mitsui Chemicals, Inc., Tokyo (JP)

( * ) Notice: Subject to any disclaimer, the term of this patent is extended or adjusted under 35 U.S.C. 154(b) by 743 days.

(21) Appl. No.: 16/493,773

(22) PCT Filed: Mar. 8, 2018

(86) PCT No.: PCT/JP2018/008988
§ 371 (c)(1),
(2) Date: Sep. 13, 2019

(87) PCT Pub. No.: WO2018/168644
PCT Pub. Date: Sep. 20, 2018

(65) Prior Publication Data
US 2020/0133031 A1      Apr. 30, 2020

(30) Foreign Application Priority Data

Mar. 13, 2017   (JP) ............................. JP2017-047407

(51) Int. Cl.
*G02C 11/00*         (2006.01)
*G01C 9/06*          (2006.01)
(Continued)

(52) U.S. Cl.
CPC ................ *G02C 11/10* (2013.01); *G01C 9/06* (2013.01); *G01C 2009/066* (2013.01);
(Continued)

(58) Field of Classification Search
CPC ........ G02C 7/083; G02C 7/101; G02C 11/10; G02B 3/14; G02B 2027/0178; G01C 9/06; G01C 2009/066; G01P 15/14; G01J 1/44
See application file for complete search history.

(56) References Cited

U.S. PATENT DOCUMENTS 5,654,786 A * 8/1997 Bylander ................. G02C 7/12
                                                       351/158
6,517,203 B1   2/2003 Blum et al.
(Continued)

FOREIGN PATENT DOCUMENTS

JP       62-009315 A        1/1987
JP       2016161807 A  *    9/2016

OTHER PUBLICATIONS

International Search Report from International Application No. PCT/JP2018/008988 dated Jun. 12, 2018.

*Primary Examiner* — Sang H Nguyen
(74) *Attorney, Agent, or Firm* — Brundidge & Stanger, P.C.

(57) ABSTRACT

Eyewear having: an optical module; an input unit; a sensing unit; a storage unit that stores at least conditions that change optical properties of the optical module; and a control unit that performs electric control of the optical module, in accordance with a set mode, by using electric control. The set modes include: a first mode in which the control unit electrically controls the optical module on the basis of a condition stored in the storage unit and a detection value for the sensing unit; and a second mode in which the control unit electrically controls the optical module on the basis of instructions received by the input unit. The conditions stored in the storage unit are updated on the basis of the detection
(Continued)

value for the sensing unit when the input unit has received an instruction in the second mode.

8 Claims, 12 Drawing Sheets

(51) Int. Cl.
    *G01J 1/44*          (2006.01)
    *G01P 15/14*        (2013.01)
    *G02B 27/01*        (2006.01)

(52) U.S. Cl.
    CPC ................ *G01J 1/44* (2013.01); *G01P 15/14* (2013.01); *G02B 2027/0178* (2013.01)

(56) References Cited

U.S. PATENT DOCUMENTS

| | | | | |
|---|---|---|---|---|
| 8,203,502 | B1* | 6/2012 | Chi | G06F 3/03547 |
| | | | | 359/630 |
| 8,427,396 | B1* | 4/2013 | Kim | G02B 27/017 |
| | | | | 345/8 |
| 2008/0055541 | A1* | 3/2008 | Coulter | G02C 7/101 |
| | | | | 351/159.45 |
| 2013/0250135 | A1* | 9/2013 | Blum | G02C 11/10 |
| | | | | 348/211.99 |
| 2017/0351118 | A1* | 12/2017 | Barrau | G02C 7/101 |
| 2019/0324294 | A1* | 10/2019 | Kamibeppu | G02C 1/10 |
| 2019/0346697 | A1* | 11/2019 | Kan | G02C 7/083 |

* cited by examiner

| ILLUMINANCE (lx) (DEFAULT VALUE) | TRANSMITTANCE (%) | | |
|---|---|---|---|
| | LIGHT-COLOR LIGHT CONTROL MODE | INTERMEDIATE-COLOR LIGHT CONTROL MODE | STRONG-COLOR LIGHT CONTROL MODE |
| 0 OR GREATER AND SMALLER THAN 200 | 100 (NO VOLTAGE APPLICATION) | 90 | 80 |
| 200 OR GREATER AND SMALLER THAN 400 | 90 | 80 | 70 |
| 400 OR GREATER AND SMALLER THAN 600 | 80 | 70 | 60 |
| 600 OR GREATER AND SMALLER THAN 800 | 70 | 60 | 50 |
| 800 OR GREATER AND SMALLER THAN 1000 | 60 | 50 | 40 |
| 1000 OR GREATER AND SMALLER THAN 1200 | 50 | 40 | 30 |
| 1200 OR GREATER AND SMALLER THAN 1400 | 40 | 30 | 20 |
| 1400 OR GREATER | 30 | 20 | 10 |

FIG. 8

EYEWEAR

TECHNICAL FIELD

The present invention relates to an eyewear.

BACKGROUND ART

In recent years, electronic devices that are wearable for a user (wearable devices) have been developed. Wearable devices are typically small since they are configured to be put on the human body. In addition, in the state where the device is put on a user, there are many difficulties in its operation, and as such the user' input operation to the wearable device is limited to a certain degree.

It has been proposed to operate a wearable device in accordance with the use state of the user and the like. For example, PTL 1 discloses an eyewear (eyeglasses) in which an electric signal to a liquid crystal lens is controlled in accordance with the inclination angle of the main body of the eyeglasses so as to automatically change the focal length. PTL 2 discloses an eyewear provided with a function of adjusting the refractive index on the basis of a detection result of a range finder and the like.

CITATION LIST

Patent Literature

PTL 1
Japanese Patent Application Laid-Open No. S62-009315
PTL 2
U.S. Pat. No. 6,517,203

SUMMARY OF INVENTION

Technical Problem

In the eyewear disclosed in PTL 1 and PTL 2, the focal length, the refractive index and the like are controlled based on information set in advance; however, the condition of achieving functions cannot be changed in accordance with user' individual information and/or user's preference.

An object of the present invention is to provide an eyewear that can change the condition of achieving functions in accordance with user' individual information and/or user's preference, and can automatically execute a prescribed function.

Solution to Problem

An eyewear in an embodiment of the present invention includes: an optical module whose optical characteristics change; an input section configured to receive an instruction from a user; a sensor section configured to detect a use condition of the optical module; a storage section configured to store at least a condition of changing the optical characteristics of the optical module; and a control section configured to change the optical characteristics of the optical module by an electric control in accordance with a setting mode. The setting mode includes at least a first mode in which the control section performs the electric control on the optical module on a basis of the condition stored in the storage section and a detection value of the sensor section, and a second mode in which the control section performs the electric control on the optical module on a basis of the instruction received by the input section. The condition stored in the storage section is updated on a basis of a detection value of the sensor section that is obtained at a time when the input section receives an instruction in the second mode.

Advantageous Effects of Invention

According to the present invention, it is possible to provide an eyewear that can change the condition of achieving functions in accordance with user' individual information and/or user's preference, and can automatically execute a prescribed function.

BRIEF DESCRIPTION OF DRAWINGS

FIG. 8 is a graph illustrating a relationship (default value) between an light illuminance sensed by an eyewear and a transmittance to visible light at an electric control lens in a light control correction mode and an eyesight light control correction mode;

DESCRIPTION OF EMBODIMENTS

The following describes an eyewear according to various embodiments of the present invention.

First Embodiment

Structure of Eyewear

Figure 1:
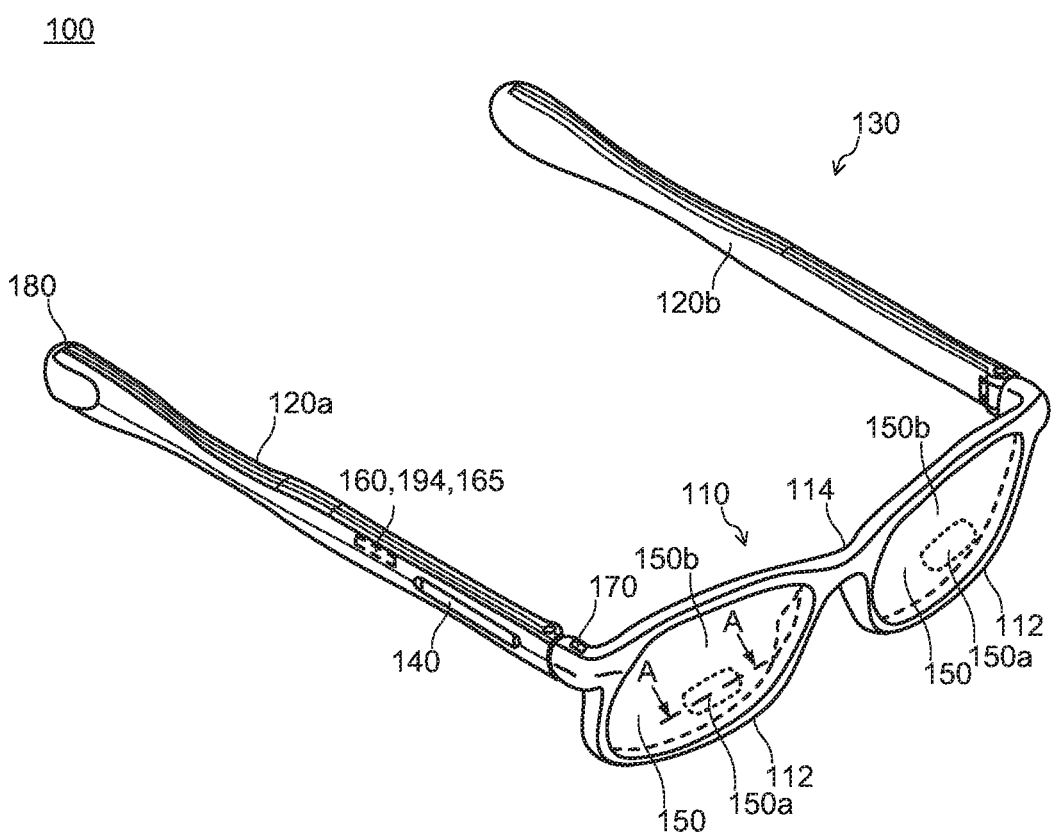
FIG. 1 is a perspective view illustrating an eyewear according to a first embodiment of the present invention.
Figure 2:
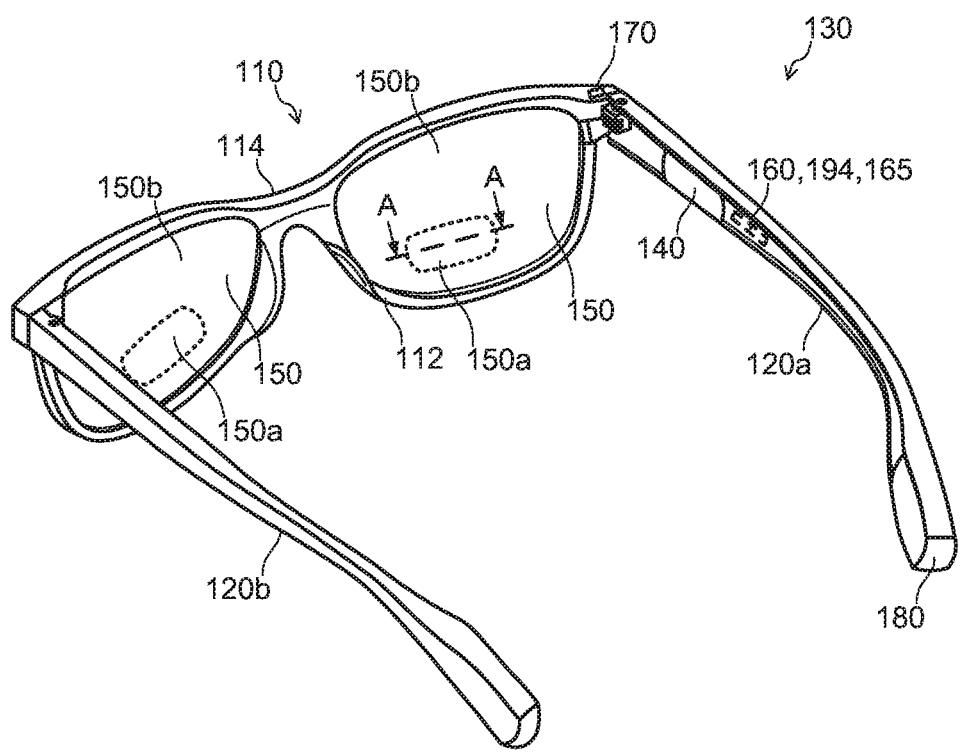
FIG. 2 is another perspective view of the eyewear according to the first embodiment of the present invention.

FIG. 1 and FIG. 2 are perspective views illustrating eyewear 100 according to the first embodiment of the present invention.

Examples of the eyewear include so-called eyeglasses (such as electronic eyeglasses and sunglasses) and goggles having an auxiliary mechanism for improving the eyesight of the user such as vision correction lenses, and various devices having a mechanism for presenting information to the user's eyes or the user's visibility (such as wearable eyeglass terminals and head-mount displays). While electronic eyeglasses for both eyes with a pair of lenses are described below as an example in the present embodiment, the eyewear according to the embodiment of the present invention is not limited to such aspects. The eyewear is not limited as long as the eyewear has a configuration including an auxiliary mechanism for improving eyesight or visibility and/or a mechanism for presenting information to the eyes when the eyewear is worn. The eyewear may not only be a device of eyeglasses type configured to be put to both ears, but also be a device configured to be put to the head or one ear. The eyewear may act not only on both eyes, but also on only one eye.

As illustrated in FIG. 1 and FIG. 2, eyewear 100 includes frame 130 including front 110 and a pair of temples 120a and 120b, input section 140, a pair of electric control lenses 150 that is an optical module whose optical characteristics are changed by an electric control, sensor section 170, computation devices such as CPU unit 165 including a central processing unit (CPU) and a random access memory (RAM) that also function as control section 160, a read only memory (ROM) that also functions as storage section 194 and the like, and power source 180. The CPU reads a program for executing the function of eyewear 100 from the ROM and loads it in the RAM, and then, executes the loaded program to control the operation of each functional part of eyewear 100. Note that, in the following description, the portions where a pair of electric control lenses 150 is disposed are referred to as the front surface (forward) of eyewear 100.

Figure 3:
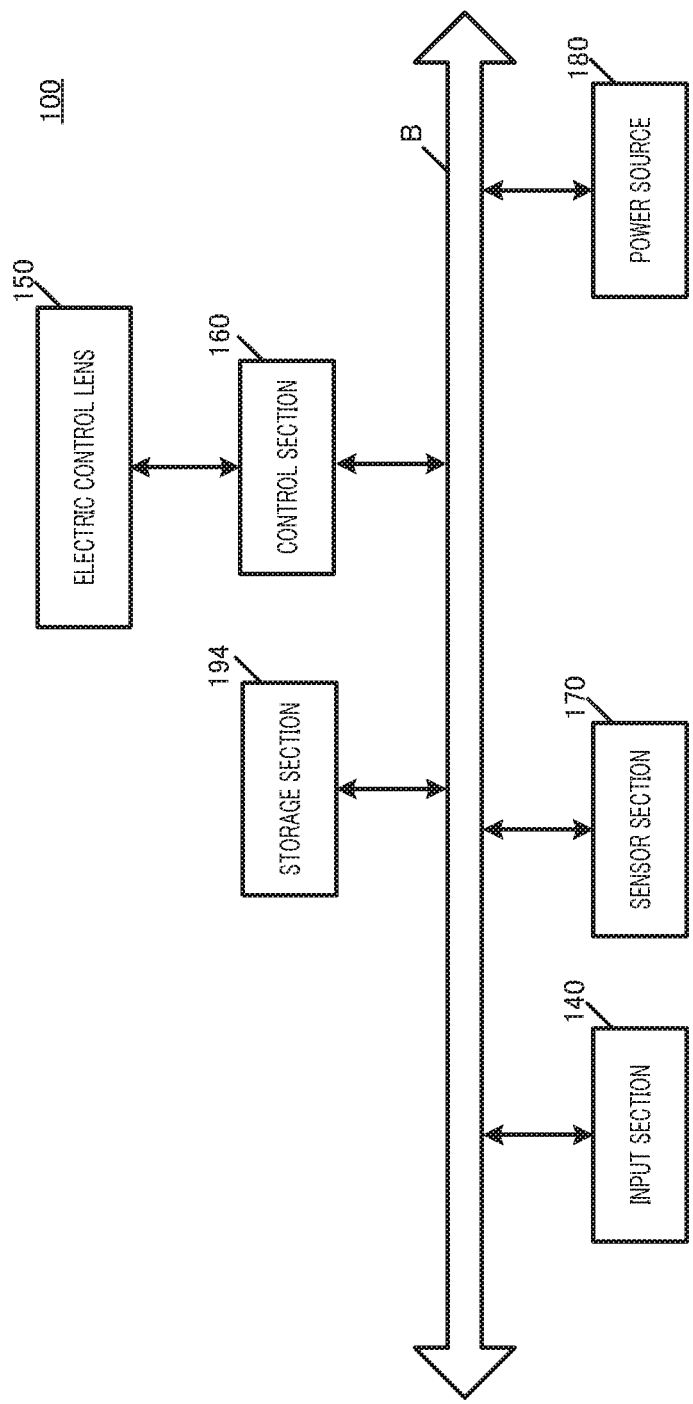
FIG. 3 is a block diagram illustrating a functional configuration of the eyewear according to the first embodiment of the present invention.

In addition, as illustrated in FIG. 3 illustrating a block diagram of a functional configuration of eyewear 100, the functional parts of eyewear 100 are connected with bus B. Below, configurations of eyewear 100 of the present embodiment are described.

Front 110 holds a pair of electric control lenses 150. Front 110 includes a pair of rims 112 supporting the pair of electric control lenses 150, and bridge 114 connecting the pair of rims 112. Rim 112 has a shape that matches the shape of electric control lens 150. Although not illustrated in the drawings, a wiring for electrically connecting between electric control lens 150 and CPU unit 165 (control section 160) is disposed inside front 110.

The material of front 110 is not limited, and may be a publicly known material used for a front of eyeglasses. Examples of the material of front 110 include polyamide, acetate, carbon, celluloid, polyetherimide and polyurethane.

The pair of temples 120a and 120b are rod-shaped members connected with front 110 at their front end portions in a bilaterally symmetric manner. Input section 140, CPU unit 165 (control section 160 and storage section 194), sensor section 170, and power source 180 are disposed in temple 120a or temple 120b (in FIG. 1 and FIG. 2, temple 120a on the right side).

The material of temples 120a and 120b is not limited, and may be a publicly known material used for a temple of eyeglasses. Examples of the material of temples 120a and 120b include polyamide, acetate, carbon, celluloid, polyetherimide and polyurethane.

Input section 140 receives user's input operations. The structure of input section 140 is not limited. Input section 140 may be a touch sensor composed of a plurality capacitances linearly disposed from the front side toward the rear side in a region on the outside and the front side of temple 120a, for example. In this case, input section 140 can receive a user's instruction through a user's operation of moving (swiping) a finger or the like along the touch sensors from the front side to the rear side, or from the rear side to the front side, a user's operation of touching (tapping) the sensors with a finger or the like without moving the finger or the like, a user's operation of touching (pressing and holding) the sensors with a finger or the like for a prescribed time, and the like.

In addition, input section 140 may receive and identify the operation amount (movement amount) of the input operation on the basis of the number of the touch sensors whose capacitance has been changed by the swipe operation.

The pair of electric control lenses 150 are held by frame front 110. Electric control lens 150 includes an electric activation section whose optical characteristics are changed by voltage application. Each electric control lens may be a spherical surface lens or an aspherical surface lens. Each electric control lens includes first region 150a whose focal length (degree) can be changed by voltage application, and second region 150b outside the first region.

Figure 4:
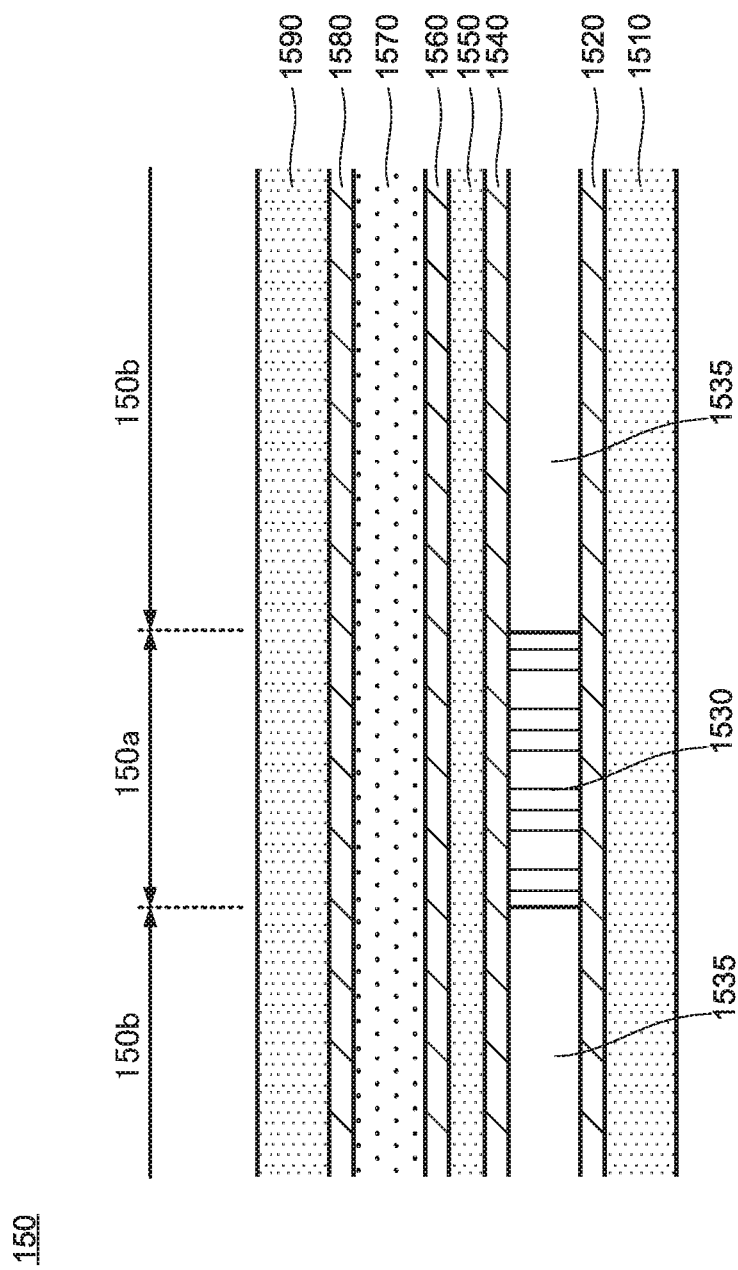
FIG. 4 is a schematic sectional view taken along A-A of an electric control lens A of the eyewear according to the first embodiment of the present invention.

FIG. 4 illustrates a schematic sectional view of the A-A portion of electric control lens 150. As illustrated in FIG. 4, first transparent substrate 1510, first transparent electrode 1520, refractive index variable layer 1530 serving as an electric activation section, second transparent electrode 1540, second transparent substrate 1550, third transparent electrode 1560, transmittance variable layer 1570 serving as an electric activation section, fourth transparent electrode 1580, and third transparent substrate 1590 are stacked in this order from the rear side (user side) in first region 150a.

Note that, although not illustrated in the drawings, first transparent substrate 1510 and first transparent electrode 1520, or second transparent substrate 1550 and second transparent electrode 1540 may have a Fresnel lens shape in first region 150a.

As illustrated in FIG. 4, first transparent substrate 1510, first transparent electrode 1520, bonding layer 1535, second transparent electrode 1540, second transparent substrate 1550, third transparent electrode 1560, transmittance variable layer 1570 serving as an electric activation section, fourth transparent electrode 1580, and third transparent substrate 1590 are stacked in this order from the rear side (user side) in second region 150b.

Note that second transparent electrode 1540 and third transparent electrode 1560 may be a common electrode. In such a case, the installation of second transparent substrate 1550 may be omitted.

First transparent substrate 1510, second transparent substrate 1550, and third transparent substrate 1590 are transparent members having a curved shape protruding toward the front side of eyewear 100.

The material of first transparent substrate 1510, second transparent substrate 1550, and third transparent substrate 1590 is not limited as long as the material is optically transparent to visible light, and may be a publicly known material that can be used as the material of lenses. Examples of the material of first transparent substrate 1510, second transparent substrate 1550, and third transparent substrate 1590 include glass and resin. Examples of the resin include polymethyl methacrylate, polycarbonate, polydiethylene glycol bisallyl carbonate and polystyrene. The materials of first transparent substrate 1510, second transparent substrate 1550, and third transparent substrate 1590 may be identical to each other or different from each other.

First transparent electrode 1520 and second transparent electrode 1540, and third transparent electrode 1560 and fourth transparent electrode 1580 are transparent electrodes that are optically transparent. First transparent electrode 1520 and second transparent electrode 1540 are disposed in a range (first region 150a) where a voltage can be applied to at least refractive index variable layer 1530. On the other hand, third transparent electrode 1560 and fourth transparent electrode 1580 are disposed in a range (first region 150a and second region 150b) where a voltage can be applied to at least transmittance variable layer 1570.

The material of first transparent electrode 1520, second transparent electrode 1540, third transparent electrode 1560, and fourth transparent electrode 1580 is not limited as long as the material is optically transparent to visible light and has conductivity. Examples of the material include indium tin oxide (ITO) and zinc oxide (ZnO). The material of first transparent electrode 1520, second transparent electrode 1540, third transparent electrode 1560, and fourth transparent electrode 1580 may be identical to each other or different from each other.

Refractive index variable layer 1530 is a layer whose refractive index for visible light is changed by voltage application. Examples of the material of refractive index variable layer 1530 include a cholesteric liquid crystal, a nematic liquid crystal and the like. When a voltage is applied to refractive index variable layer 1530 by first transparent electrode 1520 and second transparent electrode 1540, the refractive index of refractive index variable layer 1530 is reversibly changed by the change of the orientations of the liquid crystal elements and the like. As a result, when a voltage is applied to refractive index variable layer 1530, the focal length (degree) of first region 150a is changed.

Transmittance variable layer 1570 is a layer whose transmittance to visible light (hereinafter referred to also as "transmittance") is changed by voltage application. Examples of the material of transmittance variable layer 1570 include an electrochromic element, a guest-host liquid crystal, and the like. When a voltage is applied to transmittance variable layer 1570 by third transparent electrode 1560 and fourth transparent electrode 1580, the transmittance of transmittance variable layer 1570 is reversibly changed by an oxidation-reduction reaction caused with the supplied electron, a change of the orientations of the liquid crystal elements and the like. As a result, when a voltage is applied to transmittance variable layer 1570, the transmittance to visible light at first region 150a and second region 150b is changed.

In second region 150b, bonding layer 1535 is disposed between first transparent substrate 1510 and second transparent substrate 1550 so as to bond first transparent substrate 1510 and second transparent substrate 1550. Note that in the case where first transparent electrode 1520 and second transparent electrode 1540 are disposed also in second region 150b, bonding layer 1535 is disposed between first transparent electrode 1520 and second transparent electrode 1540. In addition, bonding layer 1535 also has a function of sealing the material of refractive index variable layer 1530. The material of bonding layer 1535 is not limited as long as the material is a cured product of an adhesive agent that is optically transparent to visible light.

Sensor section 170 includes at least an inclination sensor that senses the vertically downward inclination angle (hereinafter referred to also as "inclination angle") of eyewear 100 with respect to the horizontal axis, and an illuminance sensor that senses light illuminance to eyewear 100. Sensor section 170 outputs, to control section 160, an inclination angle sensed by the inclination sensor, and an illuminance sensed by the illuminance sensor.

In an automatic mode for controlling the eyewear described later, storage section 194 stores a condition (threshold) for changing the refractive index of first region 150a of electric control lens 150, and/or the transmittance of first region 150a and second region 150b of electric control lens 150.

In accordance with the setting mode as described later, control section 160 changes the optical characteristics of electric control lens 150 on the basis of the input operation received by input section 140, the condition stored in storage section 194, and the detection value of sensor section 170.

Control section 160 is electrically connected with first transparent electrode 1520, second transparent electrode 1540, third transparent electrode 1560, and fourth transparent electrode 1580 of electric control lens 150, input section 140, sensor section 170, and storage section 194. Through a control described later, the optical characteristics (refractive index or transmittance) of electric control lens 150 are changed by applying a voltage between first transparent electrode 1520 and second transparent electrode 1540, and/or between third transparent electrode 1560 and fourth transparent electrode 1580. Specifically, in eyewear 100 of the present embodiment, control section 160 executes a function of vision correction by changing the refractive index of electric control lens 150 (hereinafter referred to also as "vision correction function"), a function of light control correction by changing the transmittance of electric control lens 150 (hereinafter referred to also as "light control correction function"), and a function of simultaneously performing vision correction and light control correction by independently changing the refractive index and the transmittance of electric control lens 150 (hereinafter referred to also as "eyesight light control correction function").

Power source 180 is a rechargeable battery pack detachably held at the rear end portion of temple 120a, and supplies power to functional parts that consume power, such as input section 140, control section 160 and sensor section 170. An example of power source 180 is a nickel hydride rechargeable battery.

Control of Eyewear

Mode

Figure 5:
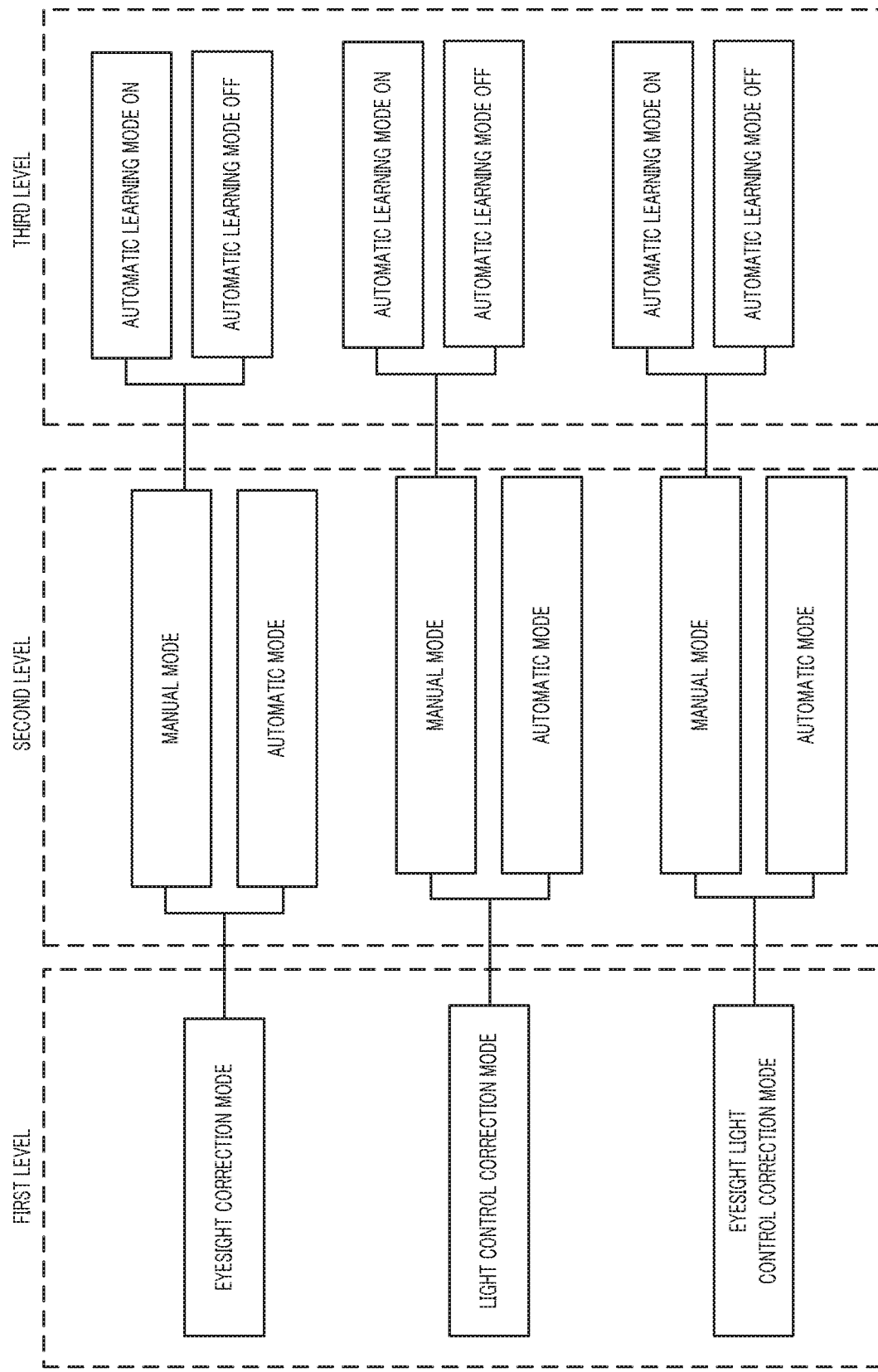
FIG. 5 is a schematic view illustrating levels of modes for controlling the eyewear according to the first embodiment of the present invention.

In eyewear 100 of the present embodiment, a plurality of modes for implementing the vision correction function, the light control correction function, and the eyesight light control correction function are set in multiple levels as illustrated in the schematic view of FIG. 5. Eyewear 100 can cause control section 160 to execute the desired operation when the user selects modes of each level through input section 140. Control section 160 of eyewear 100 controls the optical characteristics of the electric activation section by controlling the voltage to be applied between first transparent electrode 1520 and second transparent electrode 1540 in accordance with the mode set from among a plurality of modes.

In eyewear 100 of the present embodiment, a plurality of modes are set in three levels as illustrated in FIG. 5. The first level of eyewear 100 of the present embodiment includes an eyesight correction mode for executing the vision correction function, a light control correction mode for executing the light control correction function, and an eyesight light control correction mode for executing the eyesight light control correction function.

In addition, the level (second level) subordinate to the eyesight correction mode, the light control correction mode, and the eyesight light control correction mode includes a mode (hereinafter referred to also as "manual mode") in which the user manually turns on or off the vision correction function, the light control correction function, or the eyesight light control correction function, and a mode (hereinafter referred to also as "automatic mode") in which control section 160 turns on or off the vision correction function, the light control correction function, or the eyesight light control correction function on the basis of the condition stored in storage section 194 and the detection value detected by sensor section 170.

Further, the level (third level) subordinate to the manual modes includes an automatic learning mode for learning a condition of turning on or off the vision correction function, the light control correction function, or the eyesight light control correction function in the automatic mode.

The user changes the modes of the levels through input section 140. For example, in the case where input section 140 is a plurality of capacitance type touch sensors linearly disposed from the front side toward the rear side, the mode of the first level can be transferred by one level by a first instruction operation of moving (swiping) a finger or the like from the front side toward the rear side along the plurality of touch sensors. Likewise, by a second instruction operation of moving (swiping) a finger or the like along the plurality of touch sensors in a direction from the front side toward the rear side, which is a direction substantially opposite to the first direction, the mode of the second level can be transferred by one level. Further, by a third instruction operation of tapping the plurality of touch sensors without swiping the touch sensors, the mode of the third level can be transferred by one level.

Figure 6:
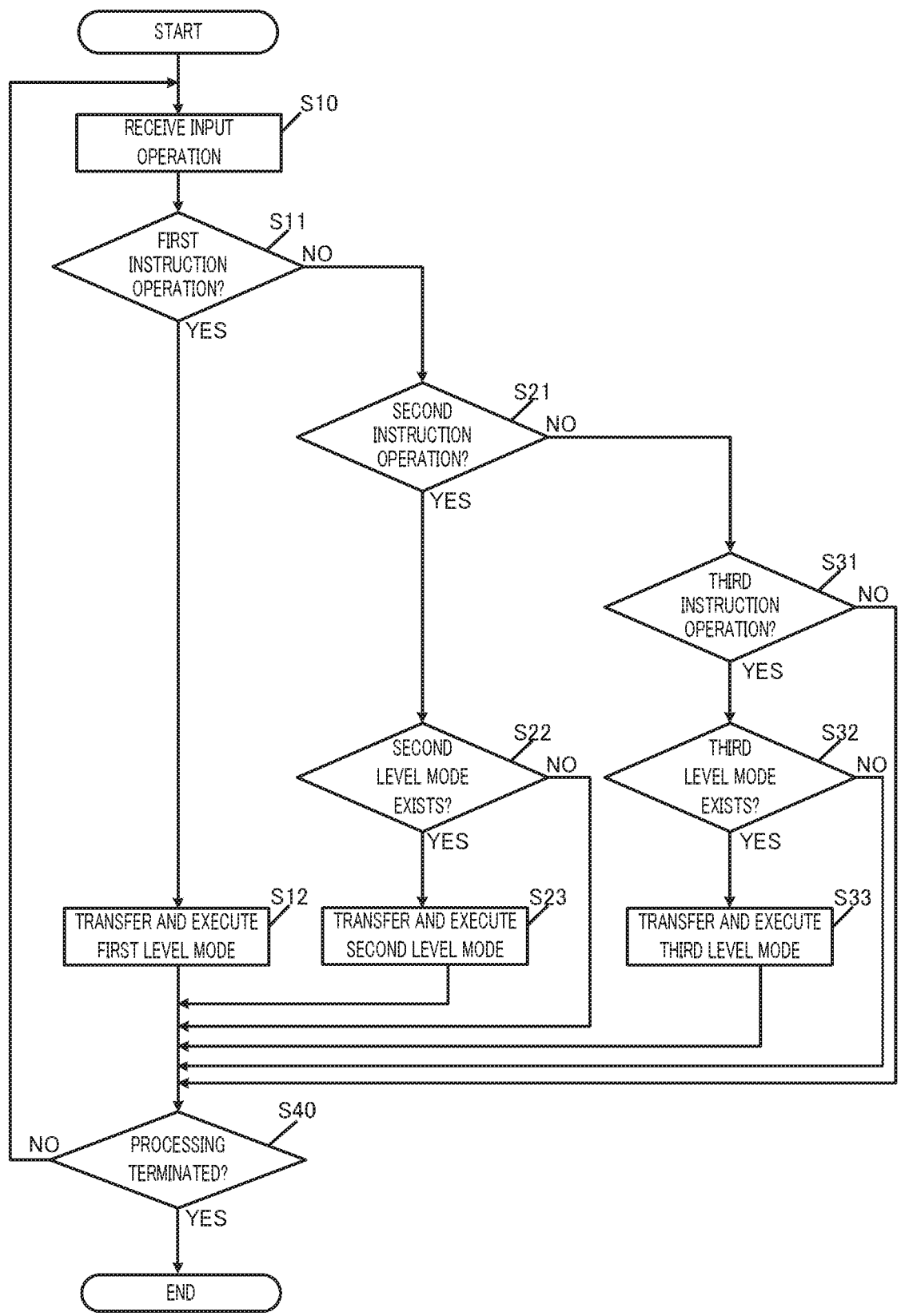
FIG. 6 is a flowchart of selection of modes of the eyewear according to the first embodiment of the present invention.

FIG. 6 is a flowchart of an exemplary operation of eyewear 100 in the case where the user of eyewear 100 according to the present embodiment selects the mode that is executed by control section 160 of eyewear 100 to cause control section 160 to execute various functions. The operation illustrated in FIG. 6 is started when input section 140, control section 160 and sensor section 170 are turned on by installation of power source 180.

In the following description, it is assumed that, at the start of the flow illustrated in FIG. 6, control section 160 is executing the eyesight correction mode as the mode of the first level, the manual mode as the mode of the second level, and the automatic learning mode (on) as the mode of the third level.

First, input section 140 detects a change of the capacitance of the touch sensor caused by a contact with a user's finger or the like, and receives the change as an input operation (step S10). In response to a reception of a signal representing the reception of the input operation from input section 140, control section 160 determines whether the instruction operation is the first instruction operation (swiping from the front side toward the rear side) (step S11).

When it is determined at step S11 that the instruction operation is the first instruction operation, control section 160 transfers the mode of the first level by one level (step S12). In this description, control section 160 is executing the eyesight correction mode as the mode of the first level at the start of the flow. Accordingly, when it is determined that the instruction operation is the first instruction operation, control section 160 transfers the mode of the first level to the light control correction mode, and executes the light control correction mode. When control section 160 transfers and executes the mode of the first level, the process proceeds to step S40.

On the other hand, when it is determined at step S11 that the instruction operation is not the first instruction operation, control section 160 then determines whether the instruction operation is the second instruction operation (swiping from the front side toward the rear side) (step S21).

When it is determined at step S21 that the instruction operation is the second instruction operation, control section 160 determines whether there is a mode of the second level corresponding to the mode of the first level that is being currently executed (step S22).

When it is determined at step S22 that there is a mode of the second level corresponding to the mode of the first level that is being currently executed, control section 160 transfers the mode of the second level and executes the transferred mode of the second level while executing the mode of the first level that is being currently executed (step S23). In this description, at the start of the flow, control section 160 is executing the eyesight correction mode as the mode of the first level, and the manual mode as the mode of the second level. Therefore, at step S23, control section 160 transfers the mode of the second level to the automatic mode and executes the mode while executing the eyesight correction mode that is the mode of the first level. When control section 160 transfers and executes the mode of the second level, the process proceeds to step S40.

On the other hand, when control section 160 determines at step S22 that there is no corresponding mode of the second level, the process proceeds to step S40.

In addition, when control section 160 determines at step S21 that the instruction operation is not the second instruction operation, control section 160 determines whether the instruction operation is the third instruction operation (tap without movement) (step S31).

When it is determined at step S31 that the instruction operation is the third instruction operation, control section 160 determines whether there is a mode of the third level corresponding to the mode of the second level that is being currently executed (step S32).

When it is determined at step S32 that there is a mode of the third level corresponding to the mode of the second level that is being currently executed, control section 160 transfers the mode of the third level by one level and executes the transferred mode of the third level while executing the mode of the first level and the mode of the second level that are being currently executed (step S33). In this description, at the start of the flow, control section 160 is executing the eyesight correction mode as the mode of the first level, the manual mode as the mode of the second level, and the automatic learning mode as the mode of the third level. Therefore, at step S33, control section 160 transfers the mode of the third level to the automatic learning mode OFF and executes the mode while executing the eyesight correction mode that is the mode of the first level and the manual mode that is the mode of the second level. When control section 160 transfers and executes the mode of the third level, the process proceeds to step S40.

On the other hand, when control section 160 determines at step S32 that there is no corresponding mode of the third level, the process proceeds to step S40.

In addition, when control section 160 determines at step S31 that the instruction operation is not the third instruction operation, the process proceeds to step S40.

Thereafter, control section 160 determines whether the process is required to be completed (step S40). For example, when a preliminarily set condition of completing the process is met, control section 160 determines that the process is required to be completed. On the other hand, when the condition is not met, it is determined that the process is not required to be completed. When the process is required to be completed in light of the determination result, control section 160 terminates the processing of FIG. 6. When the process is not required to be completed, the process is returned to step S10.

Operation of Eyewear

Eyewear 100 of the present embodiment executes the functions on the basis of the mode selected by the user as described above. When any of the eyesight correction mode, the light control correction mode, and the eyesight light control correction mode is selected by the user as the mode of the first level, control section 160 executes the function that corresponds to each mode from among the vision correction function, the light control correction function, and the eyesight light control correction function. In addition, when the manual mode is selected as the mode of the second level, control section 160 changes the on/off of the vision correction function, the light control correction function, or the eyesight light control correction function only when input section 140 has received an instruction operation from the user. On the other hand, when the automatic mode is selected, control section 160 changes the on/off of the vision correction function, the light control correction function, or the eyesight light control correction function on the basis of the condition stored in storage section 194 and the detection value detected by sensor section 170. Further, when the automatic learning mode is selected as the mode of the third level, control section 160 appropriately updates the condition of turning on or off the vision correction function, the light control correction function, or the eyesight light control correction function in the automatic mode.

Figure 7:
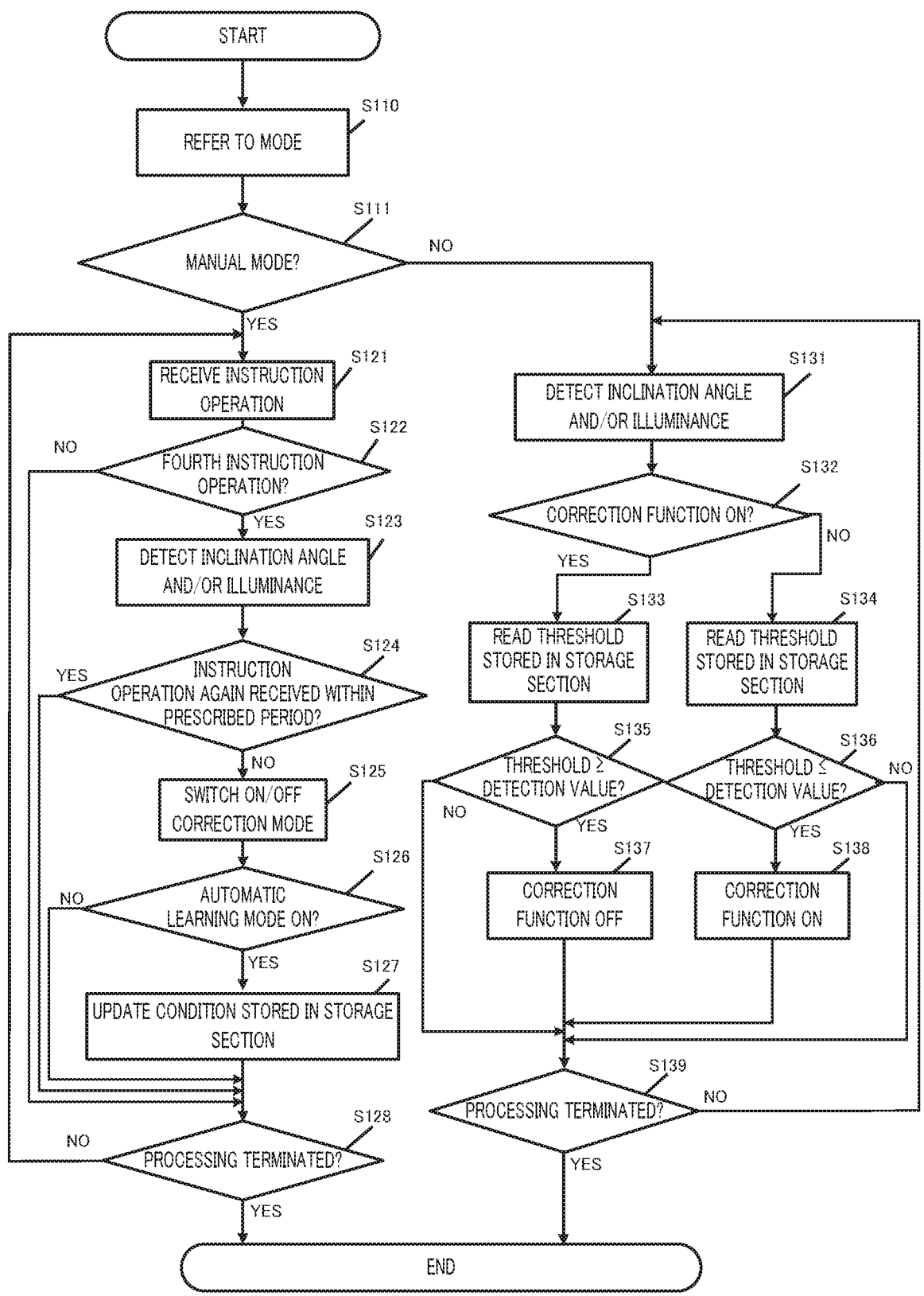
FIG. 7 is a flowchart of an exemplary operation of the eyewear according to the first embodiment of the present invention.

Now an operation of eyewear 100 is described. FIG. 7 is a flowchart of an exemplary operation of eyewear 100 according to the present embodiment used by the user. The operation illustrated in FIG. 7 is started when input section 140, control section 160 and sensor section 170 are turned on by installation of power source 180, for example. Note that, in the following description, it is assumed that the eyesight correction mode is being executed as the mode of the first level, the manual mode is being executed as the mode of the second level, and the automatic learning mode (on) is being executed as the mode of the third level at the start of the flow illustrated in FIG. 7. Also, at this time, it is assumed that the vision correction function is off.

First, control section 160 checks which mode is being executed as the mode of the second level (step S110). Then, control section 160 determines whether the currently executed mode of the second level is the manual mode (step S111).

When control section 160 determines that the manual mode is being executed, input section 140 detects a capacitance variation of the touch sensor, and receives the user instruction operation (step S121). Then, to control section 160, input section 140 transmits a signal indicating that an instruction operation has been received. Control section 160 having been received the signal from input section 140 determines whether the instruction operation is a fourth instruction operation (e.g. touching (pressing and holding) any of the plurality of touch sensors without swiping for a prescribed time with a finger or the like) differing from the first to third instruction operations (step S122).

When it is determined that the instruction operation is the fourth instruction operation, control section 160 receives an inclination angle and/or an illuminance at the time when input section 140 receives the instruction operation from sensor section 170 (step S123). At this time, the type of the data received by control section 160 is selected in accordance with the mode of the first level. In this description, it is assumed that the eyesight correction mode is being executed as the mode of the first level at the start of the flow illustrated in FIG. 7. Accordingly, control section 160 receives data relating to the inclination angle from sensor section 170. Note that, "the time of the reception of the instruction operation by input section 140" may not be completely the same as the reception of the instruction operation as long as the time is substantially the same as the reception of the instruction operation.

Subsequently, control section 160 determines whether the instruction operation has been again received within a period after input section 140 has received the instruction operation at step S121 (step S124). When control section 160 determines that the instruction operation has been again received within a prescribed time period, it is determined that the previous instruction of the user has been canceled, and the process proceeds to step S128.

On the other hand, when it is determined that input section 140 has not again received the instruction operation within a prescribed time period, control section 160 turns on or off the correction function corresponding to the mode of the first level (step S125). In this description, the eyesight correction mode is executed as the mode of the first level, and the vision correction function is set to off. Accordingly, control section 160 applies a voltage between first transparent electrode 1520 and second transparent electrode 1540, and turns on the vision correction function.

Further, control section 160 refers to the mode of the third level, and determines whether the automatic learning mode is on (step S126). At step S126, when control section 160 determines that the automatic learning mode of eyewear 100 is off, it is determined that the automatic learning is unnecessary, and the process proceeds to step S128.

On the other hand, when it is determined at step S126 that the automatic learning mode of eyewear 100 is on, control section 160 updates the condition corresponding to the mode of the first level among the conditions stored in storage section 194 (step S127). In this description, it is assumed that, at the start of the flow illustrated in FIG. 7, the eyesight correction mode is being executed as the mode of the first level and the vision correction function is off. Accordingly, control section 160 stores in storage section 194 the date and time obtained at the time when input section 140 has received an instruction operation of the user, the inclination angle detected by sensor section 170 at step S123, details of an instruction of the user (e.g. the fact that the instruction is intended for turning on the vision correction function) and the like. Then, the threshold for turning on the vision correction function stored in storage section 194 is replaced with the inclination angle detected by sensor section 170 at step S123. Thereafter, the process proceeds to step S128.

Then, control section 160 determines whether the process is required to be completed (step S128). For example, when a preliminarily set condition of completing the process is met, control section 160 determines that the process is required to be completed. On the other hand, when the above-mentioned condition is not met, it is determined that the process is not required to be completed. When the process is required to be completed in light of the determination result, control section 160 terminates the processing of FIG. 7. When the process is not required to be completed, the process is returned to step S121.

On the other hand, when it is determined at step S111 that the automatic mode is being executed, control section 160 receives the inclination angle and/or the illuminance of eyewear 100 from sensor section 170 (step S131). At this time, the type of the data that is received by control section 160 is also selected in accordance with the mode of the first level, and is set to the inclination angle in this description.

Then, control section 160 determines whether the correction function corresponding to the mode of the first level (in this description, the vision correction function) is on (step S132). When it is determined that the correction function is on, control section 160 reads, from storage section 194, a threshold relating to the inclination angle and/or the illuminance for turning off the correction function (in this description, a threshold relating to the inclination angle) (step S133). The threshold of eyewear 100 for the first use is set to a preliminarily set value. On the other hand, in the case where the automatic learning mode has been performed and the threshold has been updated, control section 160 reads, from storage section 194, the threshold that has been updated by the automatic learning mode.

Subsequently, control section 160 determines whether the detection value detected at step S131 by sensor section 170 is not greater than the threshold read at step S133 (step S135). When it is determined at step S135 that the detection value is not greater than the threshold, control section 160 turns off the correction function (step S137). In this description, the voltage application between first transparent electrode 1520 and second transparent electrode 1540 of electric control lens 150 is stopped. Then, the process proceeds to step S139. On the other hand, when control section 160 determines that the detection value is greater than the threshold, it is determined that the correction function is not required to be turned off, and the process proceeds to step S139.

On the other hand, when it is determined at step S132 that the correction function corresponding to the mode of the first level (in this description, the vision correction function) is off, control section 160 reads, from storage section 194, the threshold relating to the inclination angle and/or the illuminance for turning on the correction function (in this description, a threshold relating to the inclination angle) (step S134). Also in this case, the threshold of eyewear 100 for the first use is set to a preliminarily set value. On the other hand, in the case where the automatic learning mode has been performed and the threshold has been updated, control section 160 reads, from storage section 194, the threshold that has been updated by the automatic learning mode. Note that, the threshold for turning on the correction function may be identical to or different from the threshold for turning off the correction function. For example, the threshold (default value) for turning on the vision correction function may be set to 20°, and the threshold (default value) for turning off the vision correction function may be set to 5° and the like.

Subsequently, control section 160 determines whether the detection value detected by sensor section 170 at step S131 is not smaller than the threshold read at step S134 (step S136). When it is determined at step S136 that the detection value is not smaller than the threshold, control section 160 turns on the correction function (step S138). In this description, electric control lens 150 applies a voltage between first transparent electrode 1520 and second transparent electrode 1540. Then, the process proceeds to step S139. On the other hand, when control section 160 determines that the detection value is smaller than the threshold, it is determined that the correction function is not required to be turned on, and the process proceeds to step S139.

Thereafter, control section 160 determines whether the process is required to be completed (step S139). For example, when a preliminarily set condition of completing the process is met, control section 160 determines that the process is required to be completed. On the other hand, when the above-mentioned condition is not met, it is determined that the process is not required to be completed. When the process is required to be completed in light of the determination result, control section 160 terminates the process of FIG. 7. When the process is not required to be completed, the process is returned to step S131.

At the start of the flow illustrated in FIG. 7, it is assumed that the eyesight correction mode is being executed as the mode of the first level in the above description; however, when the light control correction mode is being executed as the mode of the first level, control section 160 receives an illuminance as the detection value from sensor section 170 at step S123 and/or step S131. In addition, of the condition stored in storage section 194, the condition relating to the illuminance is updated at step S127.

On the other hand, when the eyesight light control correction mode is being executed as the mode of the first level, control section 160 receives both the inclination angle and the illuminance as the detection value from sensor section 170 at step S123 and/or step S131. In addition, of the condition stored in storage section 194, the conditions relating to the inclination angle and the illuminance are updated at step S127.

As described above, in the automatic mode of eyewear 100 of the present embodiment, the vision correction function, the light control correction function, or the vision correction light controlling function can be automatically turned on or off based on information relating to the inclination angle and/or the illuminance collected in the manual mode. Thus, according to eyewear 100 of the present embodiment, the condition of achieving each function can be set in accordance with the user's preference and the like.

Modification of Operation of Eyewear

In the above description (the flow illustrated in FIG. 7), when input section 140 receives an instruction operation in the state where the automatic learning mode is on, the condition stored in storage section 194 is always updated at step S127. Note that, eyewear 100 of the present embodiment may update the condition at step S127 only when control section 160 determines that the update of the condition is required. For example, it is possible to adopt a configuration in which control section 160 performs a step (not illustrated) of comparing the detection value detected at step S123 and the threshold stored in storage section 194, and the condition stored in storage section 194 is updated by proceeding to step S126 only when it is determined that the detection value is shifted from the threshold by a prescribed value or greater.

In addition, control section 160 may perform a step (not illustrated) of determining whether the value detected at step S126 and a detection value previously detected by sensor section 170 fall within the same range by a prescribed number of times. In this case, at step S126, only when values falling within the same range are detected by a prescribed number of times, the process proceeds to step S126, and control section 160 updates the condition stored in storage section 194. Alternatively, the condition stored in storage section 194 may be updated when the same values are detected by a prescribed number of times.

Further, the condition stored in storage section 194 may be updated in accordance with the number of times of the acquisition of the detection values by sensor section 160 at the time when input section 140 has received the instruction operation. For example, it is possible to perform a step (not illustrated) of computing the average value of values previously detected by a prescribed number of times and the value detected at step S126. In this case, at step S126, control section 160 updates the condition stored in storage section 194 on the basis of the average value.

Further, step S127 may not be performed immediately after input section 140 receives an instruction operation. For example, it is possible to adopt a configuration in which the detection value detected at step S123 is stored separately from the threshold stored in storage section 194 so as to update the condition stored in storage section 194 by performing step S127 at an arbitrary timing (e.g. at the time when the automatic mode is selected and the like).

While the three levels are provided in the above description, the number of the levels may be increased. For example, various modes may be provided between the first level and the second level illustrated in FIG. 5. For example, a reading mode and/or a mobile device use mode etc. may be provided in a level subordinate to the eyesight correction mode. In this case, an automatic mode and a manual mode may be further provided in a level subordinate to each of these modes. A light-color light control mode, an intermediate-color light control mode, and a strong-color light control mode for changing the transmittance of electric control lens 150 with respect to the illuminance of light on eyewear 100 as illustrated in FIG. 8 may be provided in the level subordinate to the light control correction mode. The relationship between the illuminance and the transmittance illustrated in FIG. 8 is a default value, and the condition of changing the transmittance may be learned by the automatic learning mode and appropriately updated.

Note that in the case where the light-color light control mode, the intermediate-color light control mode, and the strong-color light control mode are provided in the level subordinate to the light control correction mode, the instruction operation received by input section 140 at step S121 in FIG. 7 may not be an instruction relating to on or off of the light control correction function, and may be an instruction for increasing or reducing the transmittance of electric control lens 150. In this case, at step S125, control section 160 changes the transmission amount of the visible light of electric control lens 150 (the amount of voltage applied to third transparent electrode 1560 or fourth transparent electrode 1580) without switching on or off the light control correction function.

Further, in this case, at step S127, control section 160 stores, in storage section 194, the transmittance set by the user, the illuminance of light to eyewear 100 at the time when input section 140 has received the instruction operation, and the date and time obtained at the time when input section 140 has received the instruction at step S121. Then, the value of the upper limit or the lower limit of the illuminance illustrated in FIG. 8 is replaced in accordance with the detected value.

Note that the fourth instruction operation at this time may be a swipe operation. When the fourth instruction operation is a swipe operation, the instruction regarding the degree of the transmittance of electric control lens 150 can be received by identifying the operation amount (movement amount) of the input operation on the basis of the number of touch sensors whose capacitance is changed.

In addition, in eyewear 100 of the present embodiment, control section 160 may execute functions other than the above-described functions. For example, control section 160 may execute a sleep function of supplying electricity only to some of the functional parts such as sensor section 170, an off-function in which almost all functional parts are not supplied with electricity, and the like. In addition, the standby period (change condition) until control section 160 is transferred to the above-mentioned functions may be changed by the instruction operation of the user.

For example, the sleep function or the off-function may include a subordinate-level function such as a short off-function of automatically transferring to the sleep function or the off-function when the time period (in standby period) during which no input of the instruction operation to input section 140 is made for one minute, an intermediate off-function of automatically transferring to the sleep function or the off-function when the standby period is three minutes, and a long off-function of automatically transferring to the sleep function or the off-function when the standby period is five minutes.

In addition, the instruction operation of the user in the above description may not be an instruction operation of the user wearing eyewear 100, and may be an instruction operation of a person in the proximity of eyewear 100.

Further, while the first instruction operation is a swiping operation from the front side toward the rear side, and the second instruction operation is a swiping operation from the front side toward the rear side in the above-description, the operations may be appropriately changed in accordance with the configuration of input section 140. Further, as long as the instruction operations may be identifiable, the first instruction operation, the second instruction operation, the third instruction operation, and the fourth instruction operation may be the same operations differing in the number of times of the operations (e.g. the number of taps and the number of swipe motions), or may be a combination of different input operations and the number of operations.

Second Embodiment

Eyewear

Except for sensor section 170, the configuration of an eyewear according to the second embodiment of the present invention is identical to the configuration of eyewear 100 of the first embodiment illustrated in FIG. 1 and FIG. 2. In view of this, descriptions for the components other than sensor section 170 are omitted, and only sensor section 170 is described below.

In addition to the inclination sensor and the illuminance sensor, sensor section 170 of the present embodiment includes one or more sensors or devices selected from a position detection sensor such as Global Positioning System (GPS), an acceleration sensor, an angular velocity sensor, a gyro sensor, a proximity sensor, a contact sensor, a vibration sensor, an orientation sensor, a communication device connectable to a prescribed mobile apparatus such as a smartphone through Bluetooth ("Bluetooth" is a registered trademark of Bluetooth SIG), an imaging device of a camera or the like for sensing and differentiating natural light from fluorescent lamp light, and a mechanical switch. The sensor or the device included in eyewear 100 is appropriately selected in accordance with the use of eyewear 100. In addition, the sensor or the device may be provided outside eyewear 100, and may output a detection value to control section 160 through a communication device, for example.

When sensor section 170 includes the above-mentioned sensor and/or device in addition to the inclination sensor and the illuminance sensor, control section 160 can acquire the following information, for example.

TABLE 1

| | | Sensor type |
|---|---|---|
| External environment | Location information | Position detection sensor, Illuminance sensor, Imaging device |
| | Brightness of surroundings | Illuminance sensor, Imaging device |
| | Distance to electronic apparatus | Illuminance sensor, Communication device, Imaging device, Proximity sensor |
| | Distance to visually recognized object | Proximity sensor |
| User's state | Movement state | Position detection sensor, Acceleration sensor, Angular velocity sensor, Gyro sensor |
| | Orientation | Inclination sensor, Acceleration sensor, Angular velocity sensor, Gyro sensor, Vibration sensor, Orientation sensor |
| | Wearing state of eyewear | Proximity sensor, Contact sensor |
| | Drowsiness | Inclination sensor, Acceleration sensor, Vibration sensor, Orientation sensor |

Control of Eyewear Mode

Figure 9:
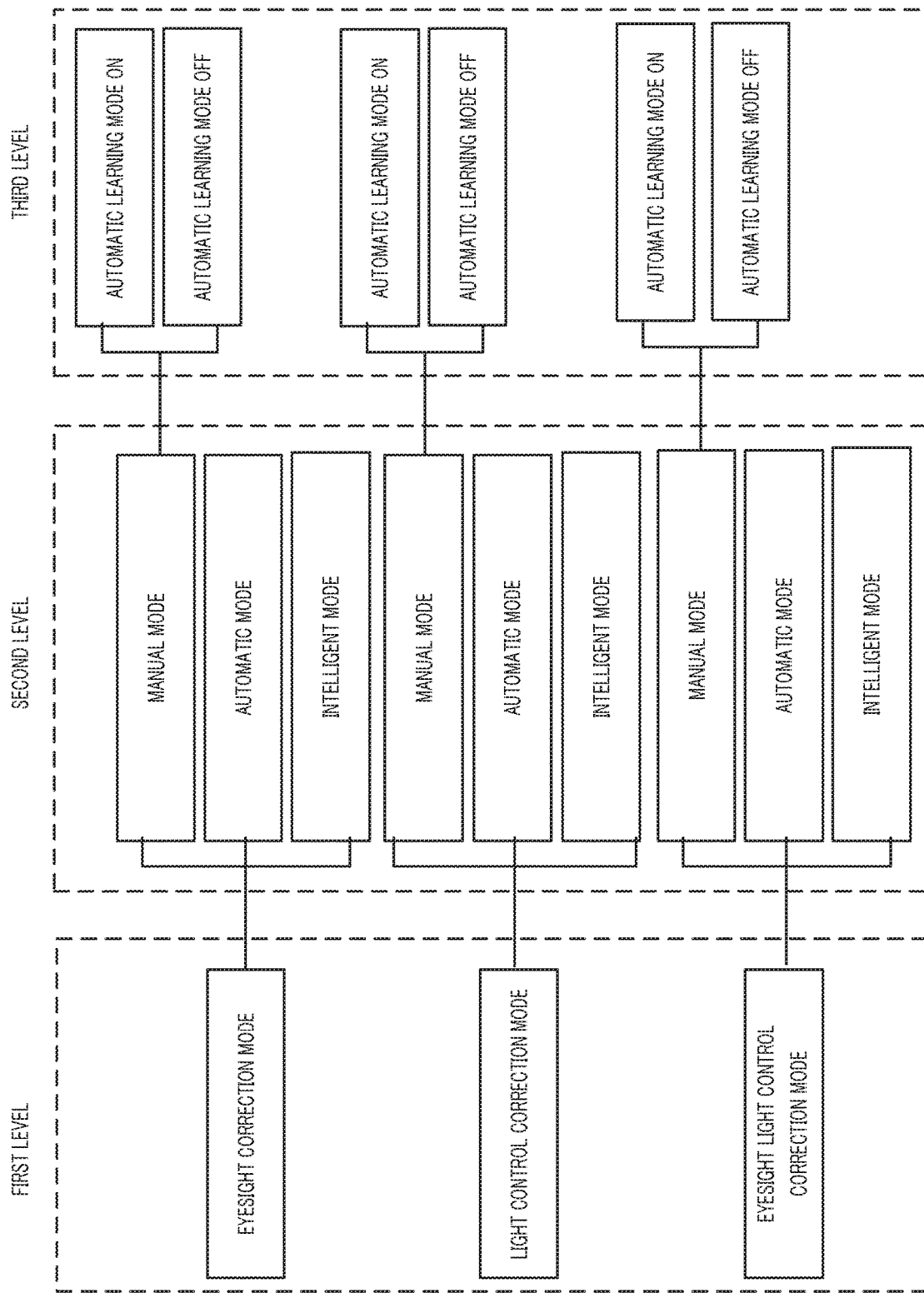
FIG. 9 is a schematic view illustrating levels of a mode for controlling an eyewear according to a second embodiment of the present invention.

In eyewear 100 of the present embodiment, a plurality of modes for performing the vision correction function, the light control correction function, and the eyesight light control correction function are set in multiple levels as illustrated in the schematic view of FIG. 9. Also in the eyewear 100, it is possible to cause control section 160 to execute a desired operation when the user selects the modes in multiple levels on input section 140.

In eyewear 100 of the present embodiment, a plurality of modes are set in three levels as illustrated in FIG. 9. The first level of eyewear 100 of the present embodiment includes an eyesight correction mode for executing the vision correction function, a light control correction mode for executing the light control correction function, and an eyesight light control correction mode for executing the eyesight light control correction function.

In addition, a manual mode, an automatic mode, and a third mode are included in the level subordinate to the eyesight correction mode, the light control correction mode, and the eyesight light control correction mode (second level). The third mode (hereinafter referred to as "intelligent mode") is a mode for turning on or off the vision correction function, the light control correction function, or the eyesight light control correction function by control section 160 on the basis of the condition stored in storage section 194 and various types detection values (the inclination angle, the illuminance, and/or other detection values) detected by sensor section 170.

Further, the level subordinate to each manual mode (third level) includes an automatic learning mode for learning the timing of turning on or off the vision correction function, the light control correction function, or the eyesight light control correction function in the automatic mode.

Note that the operation of eyewear 100 at the time when the user selects the mode of each level is identical to that of the first embodiment (the flow illustrated in FIG. 6), and therefore the description thereof is omitted.

Operation of Eyewear

Operations of eyewear 100 executing various functions based on modes selected by the user are described below. When any of the eyesight correction mode, the light control correction mode, and the eyesight light control correction mode is selected as the mode of the first level, control section 160 executes the vision correction function, the light control correction function, and/or the eyesight light control correction function corresponding to each mode. In addition, when the manual mode is selected as the mode of the second level, control section 160 changes the on/off of the vision correction function, the light control correction function, or the eyesight light control correction function only when input section 140 has received an instruction operation from the user. On the other hand, when the automatic mode is selected, control section 160 changes the on/off of the vision correction function, the light control correction function, or the eyesight light control correction function on the basis of the condition stored in storage section 194 and the detection value detected by sensor section 170. In addition, when the intelligent mode is selected, control section 160 changes the on/off of the vision correction function, the light control correction function, or the eyesight light control correction function on the basis of the condition stored in storage section 194 and the detection value detected by sensor section 170 (the inclination angle and/or the illuminance, and the detection value obtained by the sensor and/or the device). Further, when the automatic learning mode is selected in the third level, control section 160 appropriately updates the condition of turning on or off the vision correction function, the light control correction function, or the eyesight light control correction function in the automatic mode.

Figure 10:
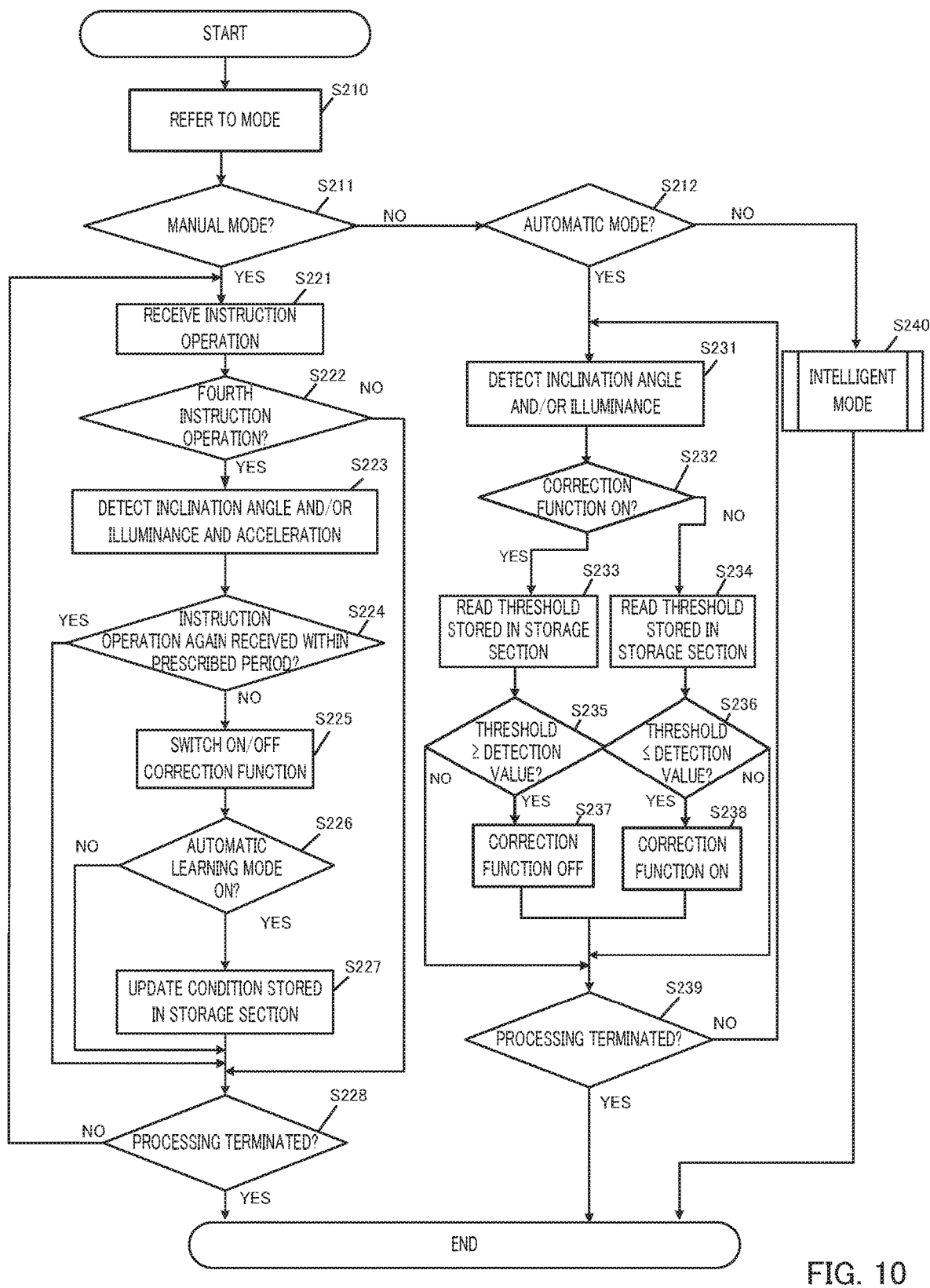
FIG. 10 is a flowchart of an exemplary operation of the eyewear according to the second embodiment of the present invention.
Figure 11:
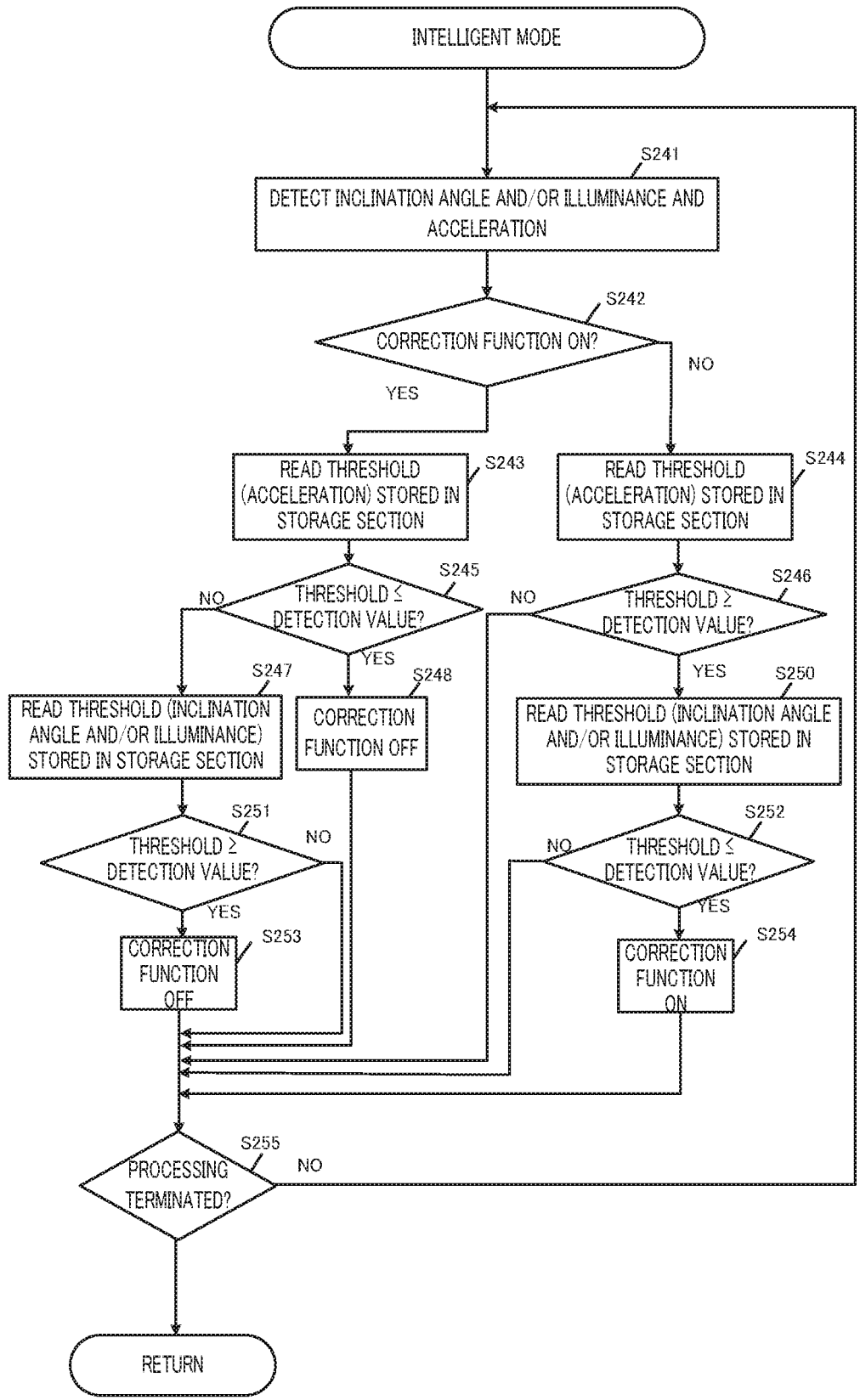
FIG. 11 is a part of the flowchart illustrated in FIG. 10.

An operation of eyewear 100 in which sensor section 170 includes an inclination sensor, an illuminance sensor, and an acceleration sensor is described below. FIG. 10 is a flowchart of an exemplary operation of eyewear 100 when eyewear 100 according to the present embodiment is used by the user, and FIG. 11 is a flowchart of a part (intelligent mode) of the flow of FIG. 10. In addition, the operation illustrated in FIG. 10 is started when input section 140, control section 160 and sensor section 170 are turned on by installation of power source 180, for example.

In addition, in the following description, it is assumed that at the start of the flow illustrated in FIG. 10, the eyesight correction mode is executed as the mode of the first level, the manual mode is executed as the mode of the second level, and the automatic learning mode (on) is executed as the mode of the third level. Also, it is assumed that the vision correction function is off at this time.

First, control section 160 refers to the mode being executed as the mode of the second level (step S210). Then, control section 160 determines whether the currently executed mode of the second level is the manual mode (step S211).

When control section 160 determines at step S211 that the manual mode is being executed, input section 140 detects the capacitance variation of the touch sensor, and receives the instruction operation of the user (step S221). Then, input section 140 transmits, to control section 160, a signal indicating that an instruction operation has been received. Control section 160 having received the signal from input section 140 determines whether the instruction operation is the fourth instruction operation (e.g. touching (pressing and holding) any of the plurality of touch sensors without swiping for a prescribed time with a finger or the like) differing from the first to third instruction operations (step S222).

When it is determined that the instruction operation is the fourth instruction operation, control section 160 receives the inclination angle and/or the illuminance of eyewear 100 and the acceleration of sensor section 170 obtained at the time when input section 140 has received the instruction operation (step S223). At this time, the type of the data that is received by control section 160 is selected in accordance with the mode of the first level. In this description, it is assumed that the eyesight correction mode is being executed as the mode of the first level when the flow illustrated in FIG. 10 is started. Accordingly, control section 160 receives data relating to the inclination angle and the acceleration detected by sensor section 170.

Subsequently, control section 160 determines whether an instruction operation has been again received within a period after input section 140 has received the instruction operation at step S221 (step S224). When control section 160 determines that the instruction operation has been again received within the prescribed time period, it is determined that the previous instruction of the user has been canceled, and the process proceeds to step S228.

On the other hand, when it is determined that input section 140 has not again received the instruction operation within the prescribed time period, control section 160 turns on or off the correction function corresponding to the mode of the first level (in this description, the vision correction function) (step S225).

Thereafter, control section 160 refers to the mode of the third level, and determines whether the automatic learning mode is on (step S226). At step S226, when control section 160 determines that the automatic learning mode of eyewear 100 is off, it is determined that the automatic learning is unnecessary, and the process proceeds to step S228.

On the other hand, when it is determined at step 226 that the automatic learning mode of eyewear 100 is on, control section 160 updates the condition corresponding to the mode of the first level among the conditions stored in storage section 194 (step S227). In this description, it is assumed that at the start of the flow illustrated in FIG. 10, the eyesight correction mode is being executed as the mode of the first level, and the vision correction function is off. Accordingly, control section 160 stores in storage section 194 the date and time obtained at the time when input section 140 has received an instruction operation of the user, the inclination angle and the like and the acceleration detected by sensor section 170 at step S223, and details of an instruction of the user (e.g. the fact that turning on of the vision correction function has been instructed, and the like). Then, the threshold (the inclination angle and the acceleration) for turning on the vision correction function stored in storage section 194 is replaced with the inclination angle and the acceleration detected by sensor section 170 at step S223. Thereafter, the process proceeds to step S228.

Then, control section 160 determines whether the process is required to be completed (step S228). For example, when a preliminarily set condition of completing the process is met, control section 160 determines that the process is required to be completed. On the other hand, when the above-mentioned condition is not met, it is determined that the process is not required to be completed. When the process is required to be completed in light of the determination result, control section 160 terminates the processing of FIG. 10. When the process is not required to be completed, the process is returned to step S221.

On the other hand, when it is determined at step S211 that a mode other than the manual mode is being executed, control section 160 determines whether the automatic mode is selected (step S212). Then, when it is determined at step S212 that the automatic mode is selected, control section 160 receives the inclination angle and/or the illuminance of eyewear 100 from sensor section 170 (step S231). At this time, the type of the data that is received by control section 160 is selected in accordance with the mode of the first level, and is set to the inclination angle in this description.

Control section 160 determines whether the correction function corresponding to the mode of the first level (in this description, the eyesight adjustment function) is on (step S232). When it is determined at step S232 that the correction function is on, control section 160 reads a threshold relating to the inclination angle and/or the illuminance for turning off the correction function (in this description, the threshold relating to the inclination angle) from storage section 194 (step S233). The threshold of eyewear 100 for the first use is set to a preliminarily set value. On the other hand, in the case where the automatic learning mode has been performed and the threshold has been updated, control section 160 reads, from storage section 194, the threshold that has been updated by the automatic learning mode.

Subsequently, control section 160 determines whether the detection value detected by sensor section 170 at step S231 is not greater than the threshold read at step S233 (step S235). When it is determined at step S235 that the detection value is not greater than the threshold, control section 160 turns off the correction function (step S237), and the process proceeds to step S239. On the other hand, when control section 160 determines that the detection value is greater than the threshold, it is determined that the correction function is not required to be turned off, and the process proceeds to step S239.

On the other hand, when it is determined at step S232 that the correction function is off, control section 160 reads the threshold relating to the inclination angle and/or the illuminance for turning on the correction function (in this description, the threshold relating to the inclination angle) from storage section 194 (step S234). Also in this case, the threshold of eyewear 100 for the first use is set to a preliminarily set value. On the other hand, in the case where the automatic learning mode has been performed and the threshold has been updated, control section 160 reads, from storage section 194, the threshold that has been updated by the automatic learning mode. Note that, the threshold for turning on the correction function may be identical to or different from the threshold for turning off the correction function.

Subsequently, control section 160 determines whether the detection value detected by sensor section 170 at step S231 is not smaller than the threshold read at step S234 (step S236). When it is determined at step S236 that the detection value is not smaller than the threshold, control section 160 turns on the vision correction function (step S238), and the process proceeds to step S239. On the other hand, when control section 160 determines that the detection value is smaller than the threshold, it is determined that the correction function is not required to be turned on, and the process proceeds to step S239.

Thereafter, control section 160 determines whether the process is required to be completed (step S239). For example, when a preliminarily set condition of completing the process is met, control section 160 determines that the process is required to be completed. On the other hand, when the above-mentioned condition is not met, it is determined that the process is not required to be completed. When the process is required to be completed in light of the determination result, control section 160 terminate the processing of FIG. 10. When the process is not required to be completed, the process is returned to step S231.

In addition, when control section 160 determines that a mode other than the automatic mode is selected at step S212, the process transfers to the intelligent mode (step S240).

As illustrated in FIG. 11, when it is determined at step 212 that a mode other than the automatic mode is selected, control section 160 receives the acceleration and the inclination angle and/or the illuminance of eyewear 100 from sensor section 170 (step S241). At this time, the type of the data that is received by control section 160 is also selected in accordance with the mode of the first level, and is set to the inclination angle and the acceleration in this description.

Then, control section 160 determines whether the correction function of eyewear 100 (in this description, the vision correction function) is on (step S242). When it is determined at step S242 that the correction function is on, control section 160 reads a threshold relating to the acceleration for turning off the correction function from storage section 194 (step S243). The threshold of eyewear 100 for the first use is set to a preliminarily set value. On the other hand, in the case where the automatic learning mode has been performed and the threshold has been updated, control section 160 reads, from storage section 194, the threshold that has been updated by the automatic learning mode.

Then, control section 160 determines whether, of the detection values detected at step S241, the acceleration is not smaller than the threshold read at step S243 (step S245). When control section 160 determines at step S245 that the detection value is not smaller than the threshold, it is determined that the user is moving, and control section 160 turns off the vision correction function (step S248), and the process proceeds to step S255. On the other hand, when it is determined that the detection value is smaller than the threshold, control section 160 reads a threshold relating to the inclination angle and/or the illuminance for turning off the correction function from storage section 194 (step S247). Then, control section 160 determines whether the detection value detected at step S241 (in this description, the inclination angle) is not greater than the threshold read at step S247 (step S251). At step S251, when it is determined that the detection value is not greater than the threshold, control section 160 turns off the correction function (step S253), and the process proceeds to step S255. On the other hand, when control section 160 determines that the detection value is greater than the threshold, it is determined that the vision correction function is not required to be turned off, and the process proceeds to step S255.

On the other hand, when it is determined at step S242 that the correction function is off, control section 160 reads a threshold relating to the acceleration for turning on the correction function from storage section 194 (step S244). Then, control section 160 determines whether the detection value (acceleration) detected at step S241 is not greater than the threshold read at step S244 (step S246). When control section 160 determines at step S246 that the detection value is greater than the threshold, it is determined that the user is moving and the turning on of the vision correction function is unnecessary, and accordingly, the process proceeds to step S255. On the other hand, when it is determined that the detection value is not greater than the threshold, control section 160 reads a threshold relating to the inclination angle for turning on the correction function from storage section 194 (step S250). Then, whether the detection value detected at step S241 (in this description, the inclination angle) is not smaller than the threshold read at step S250 is determined (step S252). When it is determined at step S252 that the detection value is not smaller than the threshold, control section 160 turns on the vision correction function (step S254), and the process proceeds to step S255. On the other hand, when control section 160 determines that the detection value is smaller than the threshold, it is determined that turning on of the vision correction function is not necessary, and the process proceeds to step S255.

Thereafter, control section 160 determines whether the process is required to be completed (step S255). For example, when a preliminarily set condition of completing the process is met, control section 160 determines that the process is required to be completed. On the other hand, when the above-mentioned condition is not met, it is determined that the process is not required to be completed. When the process is required to be completed in light of the determination result, control section 160 in FIG. 10 terminate the processing. When the process is not required to be completed, the process is returned to step S241.

While only the case where the eyesight correction mode is executed as the mode of the first level are described above, the same operation can be performed also in the case where the light control correction mode is executed as the mode of the first level, and the case where the eyesight light control correction mode is executed as the mode of the first level. Also, while the condition stored in storage section 194 is always updated at step S227 in the above description, the condition may be updated at step S227 only when control section 160 determines that the update of the condition is required as in the first embodiment.

In addition, as in the first embodiment, the number of the levels of each mode may be further increased, and a reading mode and/or a mobile device use mode may be included in the level subordinate to the eyesight correction mode, and, a light-color light control mode, an intermediate-color light control mode, a strong-color light control mode and the like may be included in the level subordinate to the light control correction mode.

While eyewear 100 includes sensor section 170 including an acceleration sensor in the above description, the same operation can be performed also in the case where sensor section 170 includes other sensors and/or devices. For example, in the case where sensor section 170 includes a position detection sensor, an imaging device and/or the like, whether the location is outdoors or indoors may be determined at step S245 and/or step S246 of the intelligent mode so as to turn on or off the light control correction function, and/or to adjust the transmittance of electric control lens 150, for example. In addition, in the case where sensor section 170 includes a proximity sensor and/or a communication device, the distance between eyewear 100 and a visually recognized object (e.g. a communication apparatus such as a mobile phone) may be determined at step S245 and/or step S246 of the intelligent mode so as to turn on or off the vision correction function and/or the light control correction function, and/or to adjust the transmittance of electric control lens 150, for example.

In addition, in the case where sensor section 170 includes an acceleration sensor, an angular velocity sensor, and/or a gyro sensor, control section 160 may determine the state (such as the orientation and drowsiness) of the user at step S245 and/or step S246 of the intelligent mode so as to turn on or off the vision correction function and/or the light control correction function, and/or to adjust the transmittance of electric control lens 150.

As described above, the automatic mode of eyewear 100 of the present embodiment can automatically turn on or off the vision correction function, the light control correction function, or the vision correction light controlling function on the basis of the information relating to the inclination angle and/or the illuminance collected in the manual mode. On the other hand, the intelligent mode can automatically turn on or off the vision correction function, the light control correction function, or the vision correction light controlling function based not only on the inclination angle and/or the illuminance collected in the manual mode, but also on the information (external environment of the eyewear, or user's state) detected by various sensors and devices included in sensor section 170. That is, eyewear 100 of the present embodiment can set more detailed condition of achieving each function in accordance with user's preference, environment, the user's state the like.

Other Embodiments

It should be understood by those skilled in the art that various modifications, combinations, sub-combinations and alterations may occur depending on design requirements and other factors in so far as they are within the scope of the appended claims or the equivalents thereof.

For example, in the first and second embodiments, eyewear 100 can execute both the vision correction function and the light control correction function. Note that the eyewear may be configured to execute only one of the functions.

For example, when the eyewear is configured to be capable of executing the vision correction function, it suffices that the electric control lens includes a first region in which a first transparent substrate, a first transparent electrode, a refractive index variable layer, a second transparent electrode, and a second transparent substrate are disposed from the rear side (user side); and a second region in which a first transparent substrate, a first transparent electrode, a bonding layer, a second transparent electrode, and a second transparent substrate are disposed from the rear side (user side).

When the eyewear is configured to be capable of executing the light control correction function, it suffices that the electric control lens includes a first transparent substrate, a first transparent electrode, a transmittance variable layer, a second transparent electrode, and a second transparent substrate.

While eyewear 100 of the first or second embodiment includes a single input section 140 capable of receiving a plurality of instruction operations, a plurality of input sections may be disposed at a plurality of portions in the frame. In this case, the control section may execute the function of the same level in accordance with the same instruction operation received by the input sections disposed at the plurality of portions, or may execute functions of different levels in accordance with received instruction operations received at respective input sections.

In addition, the frame may include a pair of nose pads for making contact with the user's nose to fix the position of the eyewear, a hinge part for rotatably connecting the temple with the front rim, a curved part and a rim locking part for screw-fixing the electric control lens to the rim at both ends of the rim, a curved tip for hooking the temple to the ear, and the like. The input section, the control section, the sensor section and the like may be disposed in these members.

Figure 12:
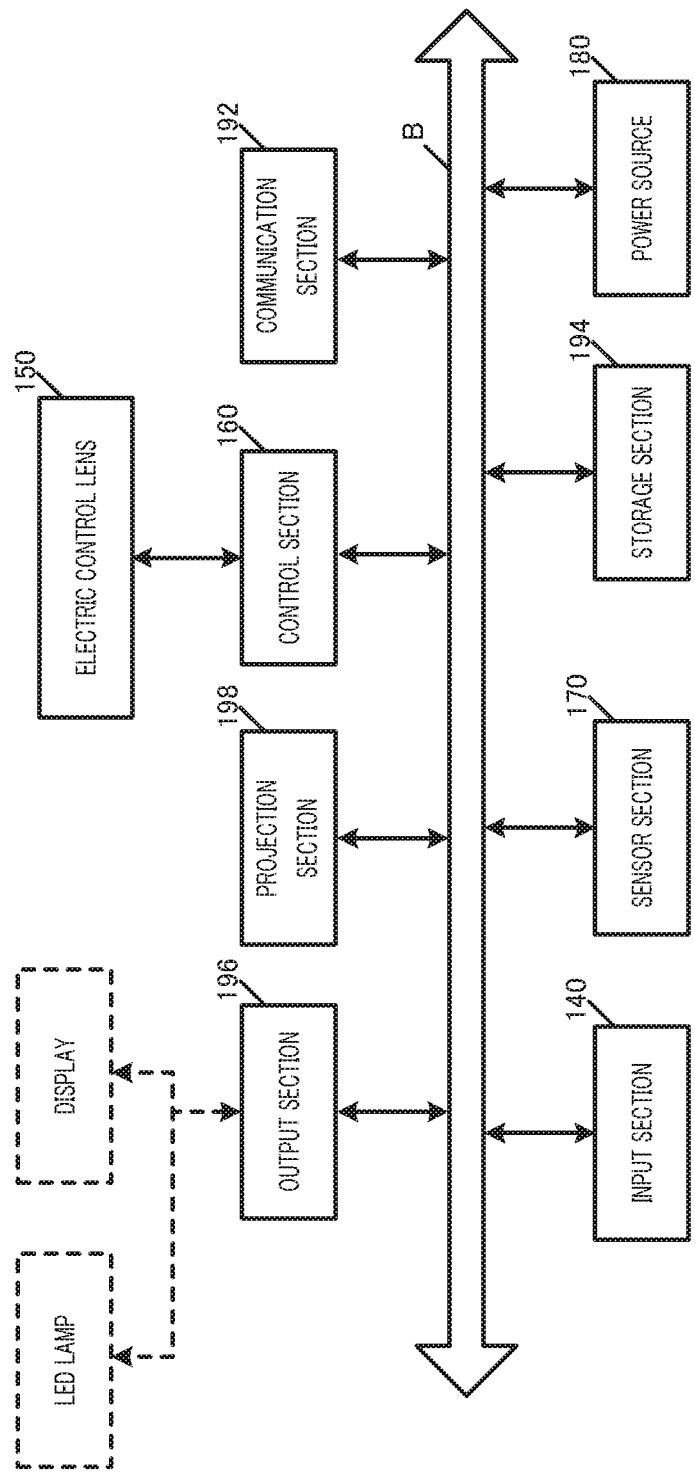
FIG. 12 is a block diagram illustrating an exemplary functional configuration of an eyewear according to another embodiment of the present invention.

FIG. 12 is a block diagram illustrating an exemplary functional configuration of the eyewear of the embodiment of the present invention. As illustrated in FIG. 12, the eyewear may include, in addition to the configurations described in the embodiment, communication section 192 capable of communicating with other devices, output section 196 capable of being connected, in a wired or wireless manner, with a display device such as a display or an external notification apparatus such as an LED lamp configured to notify a change of the function, and the like. The functional parts of the eyewear are connected by bus B.

While an electric control lens is described as an example of the optical module whose optical characteristics are changed by an electric control in the above-mentioned description, the optical module may be a transparent plate or the like on which an image and a video can be projected by projection section 198. In this case, control section 160 may execute, by the first instruction operation and the second instruction operation, the function related to the type and the pattern of the image, the video or the like to be projected.

This application is entitled to and claims the benefit of Japanese Patent Application No. 2017-047407 dated Mar. 13, 2017, the disclosure of which including the specification, drawings and abstract is incorporated herein by reference in its entirety.

INDUSTRIAL APPLICABILITY

The eyewear of the embodiment of the present invention is capable of changing the condition of achieving the automatic function in accordance with the user's individual information and/or the user's preference. Therefore, the eyewear of the embodiment of the present invention is expected to serve to progress and development of the eyewear in this field.

REFERENCE SIGNS LIST

100 Eyewear
110 Front
112 Rim
114 Bridge
120a, 120b Temple
130 Frame
140 Input section
150 Electric control lens
150a First region
150b Second region
160 Control section
165 CPU unit
170 Sensor section
180 Power source
192 Communication section
194 Storage section
196 Output section
198 Projection section
1510 First transparent substrate
1520 First transparent electrode
1530 Refractive index variable layer

1535 Bonding layer
1540 Second transparent electrode
1550 Second transparent substrate
1560 Third transparent electrode
1570 Transmittance variable layer
1580 Fourth transparent electrode
1590 Third transparent substrate

What is claimed is:

1. An eyewear comprising:
   an electric control lens whose optical characteristics change;
   an input receiver configured to receive an instruction from a user;
   a sensor configured to detect a use condition of the electric control lens;
   a storage configured to store at least a condition of changing the optical characteristics of the electric control lens; and
   a controller configured to change the optical characteristics of the electric control lens by an electric control in accordance with a setting mode,
   wherein the setting mode includes at least:
      a first mode in which the controller performs the electric control on the electric control lens on a basis of the condition stored in the storage and a detection value of the sensor, and
      a second mode in which the controller performs the electric control on the electric control lens on a basis of the instruction received by the input receiver,
      wherein the condition stored in the storage is updated on a basis of the detection value when the detection value of the sensor section that is obtained at the time when the input receiver receives the instruction in the second mode is shifted from the condition stored in the storage by a prescribed value or more.

2. The eyewear according to claim 1, wherein in the first mode, the controller performs the electric control on the electric control lens on a basis of the condition updated on the basis of the detection value of the sensor section that is obtained at the time when the touch sensor receives the instruction in the second mode.

3. The eyewear according to claim 1, wherein the sensor includes at least one of an inclination sensor and an illuminance sensor.

4. The eyewear according to claim 3, wherein the sensor further includes a mechanical switch, a position detection sensor, an acceleration sensor, an angular velocity sensor, a gyro sensor, a proximity sensor, a contact sensor, a communication device, an imaging device, or a combination thereof.

5. The eyewear according to claim 1, wherein the controller changes a refractive index of the electric control lens, and/or a transmittance of the electric control lens with respect to visible light.

6. The eyewear according to claim 1, wherein the condition stored in the storage is updated on the basis of the detection value of the sensor that is obtained at the time when the touch sensor receives the instruction in the second mode.

7. The eyewear according to claim 1, wherein the condition stored in the storage is updated on a basis of the detection value in accordance with a number of times of acquisition of the detection value of the sensor at the time when the input receiver receives the instruction in the second mode.

8. The eyewear according to claim 7, wherein the condition stored in the storage is updated on a basis of the detection value when the detection value of the sensor that is obtained at the time when the input receiver receives the instruction in the second mode falls within a same range by a prescribed number of times.

* * * * *